United States Patent [19]
Larsson

[11] Patent Number: 5,516,470
[45] Date of Patent: May 14, 1996

[54] METHOD OF TEMPERING A MOLDING TOOL

[75] Inventor: Owe G. T. Larsson, Hoganas, Sweden

[73] Assignee: AGA Aktiebolag, Lidingo, Sweden

[21] Appl. No.: 423,315

[22] Filed: Apr. 18, 1995

Related U.S. Application Data

[63] Continuation-in-part of Ser. No. 108,750, Mar. 4, 1992, Pat. No. 5,460,761.

[30] Foreign Application Priority Data

Mar. 5, 1991 [SE] Sweden ............................ 9100663

[51] Int. Cl.⁶ .................................... B29C 45/73
[52] U.S. Cl. ..................... 264/39; 249/79; 249/80; 264/102; 264/328.16; 425/546; 425/547; 425/552
[58] Field of Search ................. 264/39, 40.6, 82, 264/83, 102, 519, 528, 552, 219, 327, 328.16, 335; 425/144, 546, 552, 547, 437; 249/79, 80, 66 A

[56] References Cited

U.S. PATENT DOCUMENTS 4,139,177  2/1979  Hanning .................. 425/552
4,177,238  12/1979  Allen ...................... 264/40.3

FOREIGN PATENT DOCUMENTS 4-74620  3/1992  Japan ...................... 425/552

*Primary Examiner*—Jill L. Heitbrink
*Attorney, Agent, or Firm*—Scully, Scott, Murphy & Presser

[57] ABSTRACT

Method for tempering a molding tool intended for production of products of natural or synthetic polymers, which molding tool includes one or more molding parts (3, 4) made of sintered metal with communicating pores obtained by pressing at a high pressure and sintering at a high temperature of a powdered material, in which molding part or parts (3, 4) a molding cavity (9) has then been made, whereby preferably the outer envelope surface of the molding tool is tight. The method comprises tightly connecting one or more channels, capillary tubes (6, 8) or the like through the tight outer envelope surface to the mould material of the molding tool situated inside, which material contains a large number of small communicating pores and feeding a gas having a suitable state and a suitable temperature through the channels thereby causing a rapid tempering of the molding tool to a desired extent.

29 Claims, 5 Drawing Sheets

METHOD OF TEMPERING A MOLDING TOOL

This is a continuation-in-part of U.S. patent application, Ser. No. 08/108,750 filed Mar. 4, 1992, now U.S. Pat. No. 5,460,761.

The present invention relates to a method of tempering a molding tool intended for production of products of natural or synthetic polymers, which molding tool comprises one or more molding parts made of sintered metal or metal alloy with communicating pores. The molding parts are obtained by pressing a powdered material at a high pressure and sintering at a high temperature. A molding cavity has then been made in the molding part or parts. Preferably the outer envelope surface of the molding tool is tight. Usually the metal or metal alloy is selected from the group consisting of iron based low alloy carbon steel, stainless steel and high alloy alloy steel containing titanium, nickel, tungsten, chromium or molybdenum.

From the Swedish patent 8501589-9 it is known before to produce molding parts of sintered metal, whereby the molding parts get communicating pores. A molding cavity is produced in the molding parts, which together constitute a mold intended for production of products of natural or synthetic polymers by injection molding.

When the molding cavity has been completed the envelope surfaces are tightened. The center of said known invention consists in the formation of a reservoir in the pore system of the mold for temporary reception of air or another gas formed at the injection molding. When the mold is opened after each production cycle the gas is released again from the reservoir.

The known process disclosed above works very well. At some applications there are, however, difficulties in regulating the temperature in the different parts of the molding tool. Moreover, in certain cases the pores will be clogged by by-products formed at the molding of the polymer products.

For instance at injection molding of thermoplasts in steel molds, often about 80% of the production cycle, consists of cooling time. The thermoplast is injected via a gate or another nozzle into the molding cavity at a temperature of about 90° C.–300° C. The plastic product is cooled in the molding cavity by conduction and the heat is removed by water cooling in channels situated outside the molding cavity or drilled into the mold steel.

When cooling channels are placed in the mold steel, you often get the problem that they make the molding construction weaker. Of course, this is especially true for small areas. A weak mold construction cannot be accepted. Therefore, certain areas of the mold are not provided with cooling channels, which of course results in an insufficient cooling.

Another considerable problem is to be able to arrange cooling channels in connection with a complex molding cavity. This results in an uneven cooling or tempering of the molding cavity and also a deterioration of the quality of the plastic product.

Another very frequent problem, especially at the production of big products, is that the flow paths i.e. the distance from the injection site to the middle of the product is so long that the plastic is cooled to much before it has filled the whole cavity. Then, often certain inner parts of the cavity will get defects in respect of the molded plastic.

Thus, an uneven tempering of the molding cavity is a big problem both at the molding of thermoplasts and thermosets.

In the U.S. Pat. No. 5,021,203 a method for solving the above tempering problem and the problem with clogging of the pores is disclosed. Then the temperature is regulated in a molding tool intended for the production of products of natural or synthetic polymers.

The molding tool comprises one or more molding parts made of sintered metal with communicating pores obtained by pressing a powdered material at a high pressure and sintering at a high temperature. A cavity has then been made in the molding part or parts. The pores are open towards the molding cavity while the outer envelope surface of the molding tool is tightened against leakage.

A heating buffer is arranged in the molding tool by filling the communicating pores with a liquid with a high vaporizing temperature. The pressure on the liquid in the pores is regulated by means of a suitable pressure producer connected with the communicating pores in the molding tool. The pressure is arranged to be automatically increased to counteract the inner pressure of the mold against the liquid in the pores when polymer is introduced into the closed molding tool. The pressure is then automatically decreased when the molding tool is opened again and the inner pressure of the mold is released. In this way the pores will preferably be filled with the above liquid during the whole production cycle.

The liquid prevents the pores from being clogged by by-products formed at the molding of the polymer products or by fillers etc in the polymer material used. Accordingly, such by-products will be included in the polymer product instead of clogging the pores in the porous molding parts of the molding tool.

The liquid is intended for absorbing air, steam and other gases which are possibly formed at the molding. These gases can then be released from the liquid when the molding tool is opened after each production cycle.

Since the liquid is evenly distributed in the whole pore system an even tempering of the molding tool is obtained.

If necessary the molding tool can be heated or cooled by outside aggregates and/or by circulating a temperature regulating medium via channels with tight walls arranged in the porous molding parts or any other parts of the molding tool.

Usually, the temperature in the molding tool is regulated to between about +20° C. and about +170° C. However, of course it is possible to work outside said interval too. The limit upwards in temperature is the vaporizing temperature of the liquid used.

Thus, according to the U.S. Pat. No. 5,021,203 a temperature leveling effect in the molding tool is obtained by distribution of a liquid with a high vaporizing temperature in the communicating pores.

Sometimes it is desirable to be able to temper a molding tool in a more careful way to bring about optimal molding conditions and thereby the shortest possible production cycle for the molded polymer products produced.

According to the present invention it has been possible to satisfy the above desire and bring about a method for tempering a molding tool intended for production of products of natural or synthetic polymers, which molding tool includes one or more molding parts made of sintered metal or metal alloy with communicating pores obtained by pressing at a high pressure and sintering at a high temperature of a powdered material, in which molding part or parts a molding cavity has then been made, whereby preferably the outer envelope surface of the molding tool is tight. The method comprises tightly connecting one or more channels, capillary tubes or the like through the tight outer envelope surface to the mold material of the molding tool situated inside, which material contains a large number of small communicating pores and feeding a gas having a suitable state and a suitable temperature through the channels thereby causing a rapid tempering of the molding tool to a desired extent.

According to one embodiment of the invention cold or warm gas is fed through the channels.

According to another embodiment gas in liquid state is fed through the channels. The liquid is transformed to gaseous state by expansion in the molding tool outside the channels, whereby a strong cooling of the molding tool is obtained.

At all embodiments of the invention the gas used can consist of carbon dioxide, nitrogen, air, argon, helium hydrogen or a mixture of at least two thereof. Of course the liquid state phase of the gas used can be obtained in a usual way by compressing and cooling. Usually carbon dioxide, nitrogen air or a mixture of at least two thereof is preferred.

According to one embodiment of the invention, where liquid state gas is used, the molding tool is provided with at least one expansion room made inside the outer tight envelope surface. A capillary tube or a channel for the charged liquid state gas runs into the expansion room. The liquid will expand to gaseous state in the expansion room and then be distributed through the communicating pores at cooling of the molding tool.

The capillary tube or the channel can either run freely into the expansion room or bear against the porous wall of the molding tool. In both cases it is important that the expansion room is tightened in respect of leakage against the outer envelope surface of the molding tool.

The molding tool can be provided with one, two or more expansion rooms with accompanying capillary tubes or channels depending on the size of the molding tool, the desired cooling effect etc. At the use of a molding tool consisting of one movable and one stationary part it is often suitable to have one expansion room in each of the two parts.

The capillary tubes can also have another function in addition to that disclosed above. Thus, they can also be used for evacuation of enclosed air and/or other gases from the molding cavity out of the mold. These gases are often formed at the molding of the polymer.

Accordingly, at injection molding it is suitable as a first measure, when the mold has been closed and the plastic has been injected, to evacuate the gas released from the polymer via the capillary tubes and then feed the cooling liquid state gas or cold gaseous state gas through the capillary tubes.

At another embodiment of the invention selected parts of the envelope surface are open. Then the released gas can be evacuated through the wall of the mold. Preferably this alternative is used together with capillary tubes used for the same purpose as mentioned above. Usually, the envelope surface is tight in the area around the capillary tube to give the best effect of the tempering medium fed through the capillary tube. Thus, the tempering gas will disperse through the pores of the mold and not escape so quickly out of the mold again via the open parts of the envelope surface if said open parts are situated a certain distance from the inlet of the capillary tube.

For instance if two capillary tubes with accompanying expansion rooms are used the temperature regulating gas can be fed in one capillary tube while said gas, enclosed air and/or gas released from the polymer can be evacuated via the other tube.

Of course also separate evacuation channels can be arranged to evacuate the tempering gas from the porous molding part or parts.

The molding cavity can be made in such a way that the pores are open or closed towards the molding cavity. It is also possible to construct the molding cavity in such a way that one area of pores bordering on the molding cavity will be closed while another area of these pores will be open.

If any portion of the pores bordering on the molding cavity are open, of course the temperature regulating gas will get into contact with the plastic product produced at the molding. When the mold is then opened gas will stream out through the pores and into the molding cavity. This gas streaming into the molding cavity can be used for ejecting the product produced out of the mold when the mold is opened after each molding cycle. Thereby the usual mechanical or pneumatic ejectors in the molding tool can often be omitted. This will decrease the cycle time which includes the time for ejection. Mechanical and pneumatic ejectors namely give inconvenient marks on the products made if the polymer has not cooled down sufficiently before the ejection of the product. In order to avoid such problems it is therefore necessary at conventional processes to have a longer cooling time than according to the invention where the gas ejects the molded product. The gas will be distributed over a large surface, possibly the whole surface of the product and gives no marks.

If mechanical or pneumatic ejectors are used as a complement they can be operated with a lower pressure or be placed at a more convenient spot since the gas will assist at the ejection of the molded product. Thus, also in this case the cooling time and thereby the cycle time can be decreased as compared with conventional methods.

According to one embodiment of the invention the temperature in the molding tool can be regulated to the desired level by alternately feeding warm or cooling gas through the channels.

At another suitable embodiment of the invention warm gas is charged through the channels before filling the molding cavity with polymer. When the molding cavity has been filled with polymer the molding tool is then cooled by feeding gaseous or liquid state gas through the channels. Thereby the cycle time for the production of each polymer product is decreased maximally. Since the temperature can be regulated in this way also the polymerization reactions can be influenced and directed at an optimal temperature.

In the preheated molding tool the polymer will be kept at a higher temperature for a longer time which results in a low viscosity at the filling of the mold. Thereby the mold will be filled easily and quickly. In spite of that the cooling time can be short depending on the above effective cooling with gas.

For instance at injection molding of thermoplast the low viscosity of the polymer is useful since injection molding machines with a lower injection pressure than usual can be adopted. Of course the investment costs will be decreased considerably if such smaller injection molding machines can be used.

At the last-mentioned alternative warm gas can be supplied via the channels already at the ejection of the polymer product. Thereby the cycle time will be extremely short.

Preferably the plastics material used according to all embodiments according to the invention consists of a thermoplast such as polypropylene, polyvinyl chloride, polyethylene, polystyrene and polyethylene terephthalate or an ionomeric thermoplast such as ethylene-acrylate polymer. However, the invention works very well independent on which polymer that is to be used in the molding tool. Therefore, it is also possible to use thermosets such as polyester, phenolic plastic and amino plastic by means of the method according to the invention.

At the molding of polypropylene by means of the method according to the embodiments of the invention, products having a greater transparency than usual can be obtained. This positive effect depends on the extreme cooling possibility according to the invention. For instance as compared to polyvinyl chloride, polypropylene has got many positive properties not least from an environmental point of view. Since polyvinyl chloride can be molded without problems to products as clear as glass said plastic has been used for many applications where polypropylene has been used to a very low extent. Thus, the present invention is epochmaking in respect of using polypropylene for the production of plastic bottles for instance.

Suitably the temperature of the molding tool can be regulated to +200° C. to −25° C.

The molding tool tempered according to the invention is intended for injection molding, compression molding, blow molding, extrusion, thermo molding or foiling.

Another embodiment of the invention relates to a method of tempering a molding tool comprising (a) introducing molten polymer into a molding cavity, said molding cavity formed by at least two members, wherein at least one of said molding members is made of sintered metal or metal alloy having communicating pores, the pores being closed toward said molding cavity; (b) introducing a coolant fluid at higher than atmospheric pressure into said communicating pores, of said porous molding member, said fluid selected from the group consisting of carbon dioxide, nitrogen, air, argon, helium, hydrogen or a mixture of at least two thereof and introduced into said pores by means of at least one inlet which passes through an envelope surface being tight at least around said inlet, the coolant fluid being evacuated via at least one separate evacuation channel or via open parts of the envelope surface, whereby said molten polymer is solidified into a polymeric article insaid molding cavity be said coolant fluid; and (c) opening said molding tool.

The coolant fluid in step (b) is usually introduced into an expansion room provided in said molding member and in communication with said communicating pores.

The inlet for the coolant fluid can consist of a channel, capillary tube or the like.

The inlet can also consist of a slot situated between the porous member of sintered material and a solid nonporous supporting member.

The solid supporting member is preferably made of metal, metal alloy or a heat insulating material such as ceramics.

In this embodiment with a solid nonporous supporting member it is advantageous if the member of sintered material facing the molding cavity is thin. Thereby a rapid tempering is achieved. If the solid supporting member is made of such a heat insulating material or an inert of such insulating material is arranged between the sintered member and the supporting member the velocity of the tempering can be further improved.

The introduction of coolant fluid and evacuation thereof in step (b) can be made continuously. Alternatively, and preferably it is made discontinously in pulses, which often last about 1 to 5 seconds with intervening pauses of about 0.5 to 1.5 seconds.

The coolant fluid in step (b) is preferably a liquid state gas until it reaches the expansion room or the slot respectively where it is transformed to a gas which is distributed through the communicating pores at cooling of the polymeric material via the porous molding parts by evaporation of the liquid state gas.

Sometimes it is advantageous to preheat the molding tool by introducing in a step (d) warm gas into the communicating pores of the molding member while said molding tool is open.

The introduction of warm gas into the communicating pores can continue when the molding tool is closed prior to the introduction in step (a) of molten polymer into the molding cavity. Thereby the molding tool is further preheated and the cycle time for the production of each polymer product can be decreased.

The warm gas can be introduced via at least one separate inlet usually placed close to the molding cavity surface to bring about a rapid heating of the porous molding member defining the molding cavity.

The introduction of the polymer into the molding tool cavity is step (a) is preferably made by injection. However also the other methods mentioned above are useful.

The molding tool temperature in steps (a) to (e) varies from −25° C. to 200° C.

Usually two mold members are used to define the molding cavity. Sometimes both are formed of sintered metal.

Any air or gas included in the closed molding cavity is forced out of the cavity when the molten polymer is introduced thereto in said step (a). The air or gas can be evacuated through the evacuation channels. The evacuation channels can be provided with valves by which the pressure of the gas in the pores can be regulated. Usually the evacuation channels are placed in the member of sintered material and reaches through the envelope surface. Preferably a part of the surface of the evacuation channels situated inside said member is tight. In this way the flow of the gas can be forced to pass the vital parts of the pore system before it is released via the evacuation channels. Usually the coolant fluid and the warm gas respectively are charged in steps (d) and (e) at a pressure of 2–70 atmospheres through the inlet into the molding tool. Preferably the pressure is 5 to 60 atmospheres.

Often a liquid coolant gas is charged in step (b) in such an amount and velocity that the pressure of the resulting coolant gaseous state gas reaches a level where the gas is transformed to liquid which is then let to expand to gaseous state gas. In this way another rapid cooling step is obtained. By arranging the evacuation channels in a proper place the strong cooling effect can be directed to a desired area of the molding member.

The pores of the porous molding member at the surface of the molding cavity are closed by a thin layer preferably formed by means of mechanical treatment, heat treatment or coating of the surface.

The coating can be provided by vacuum coating including chemical gas coating and physical gas coating including evaporation, ion plating and sputtering.

Usually the surface is coated with a thin layer of titanium, nickel, chromium, titanium carbide, titanium nitride or aluminum trioxide.

In general the thin layer has a thickness of 1 μm to 2 mm, preferably 3 μm to 0.5 mm. Sometimes it is advantageous to provide at least one molding member with a glossy or textured molding cavity surface. The polymer article will then get the corresponding surface structure.

The present invention will be explained further in connection with the embodiment examples below and the enclosed figures of which FIG. 1 in a simplified form shows a cross-section of an injection molding tool and certain peripheral equipment used at an embodiment of the invention.

Figure 1:
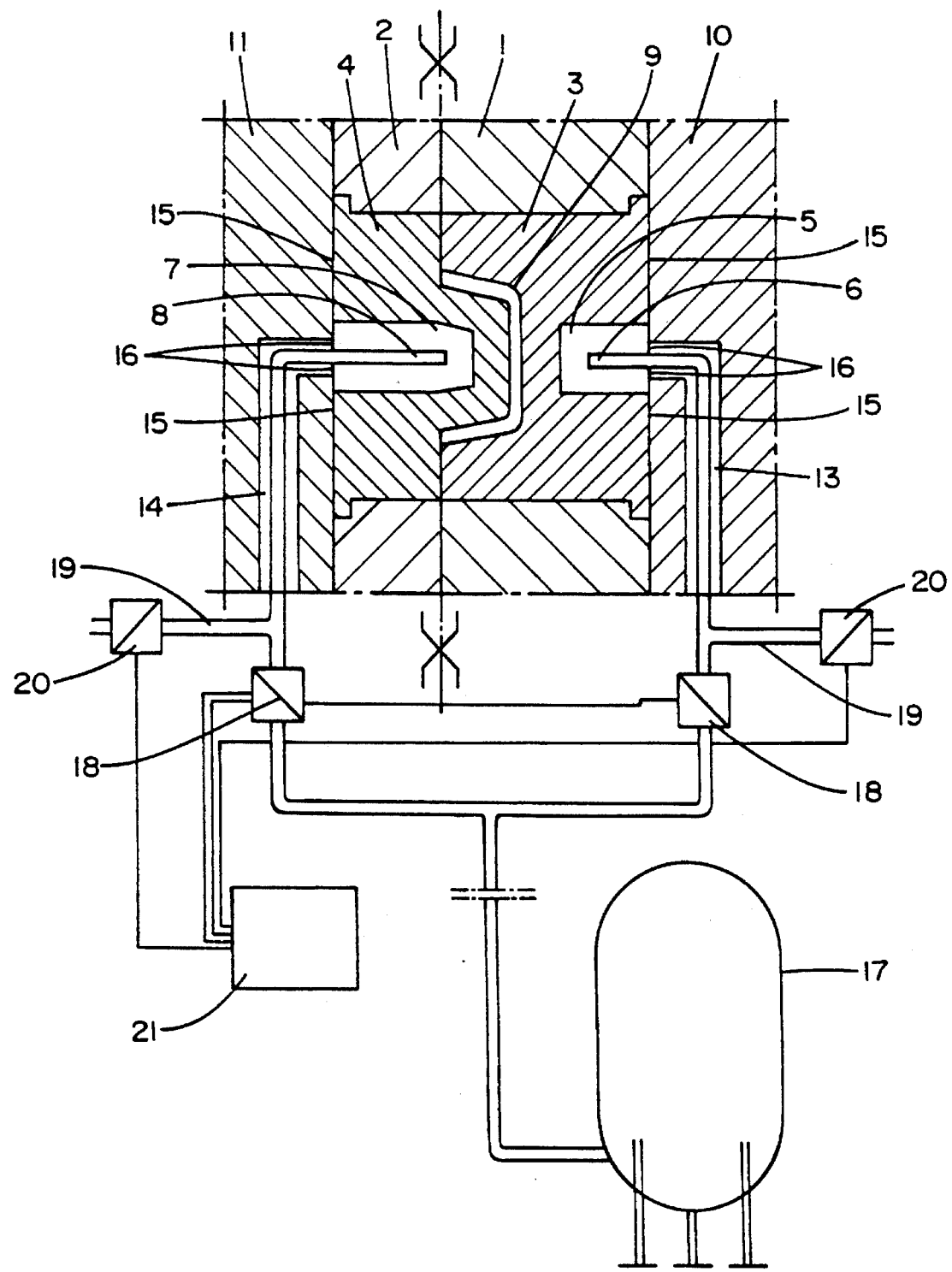

On FIG. 1 an injection molding tool comprising one mobile half 1 and one stationary half 2 is shown. Each molding half comprises a molding part 3, 4 made of a porous sintered material with communicating pores as disclosed above. In the part 3 there is an expansion room 5 whereinto a capillary tube 6 runs. Also the part 4 contains an expansion room 7 whereinto a capillary tube 8 runs. The capillary tubes 6 and 8 run freely into the expansion rooms 5 and 7 respectively and stop a short distance from the inner wall of the expansion rooms.

Between the molding halves 1 and 2 a molding cavity 9 is formed. The molding parts 3 and 4 have pores which are open towards the molding cavity 9. At the outside the molding parts 3 and 4 are provided with non-porous molding parts 10 and 11 respectively on all sides. Recesses 13 and 14 for the capillary tubes 6 and 8 respectively have been made in the molding parts 10 and 11.

Sealings 15 are arranged between the parts 3 and 10 and 4 and 11 respectively. Sealings 16 are also arranged between the outer surfaces of the capillary tubes 6, 8 and the recesses 13 and 14 respectively.

A container 17 with liquid carbon dioxide is connected to the capillary tubes 6, 8. The supply of gas can be regulated by hand valves 18. Gaseous state cooling gas, air and/or gases formed at the molding of the plastic can be evacuated via pipes 19 and hand valves 20.

The addition of liquid state cooling gas, evacuation of gaseous state cooling gas and gases possibly formed from the polymer as well as the opening and the closing of the molding tool etc can be directed by means of a control unit 21.

Figure 2:
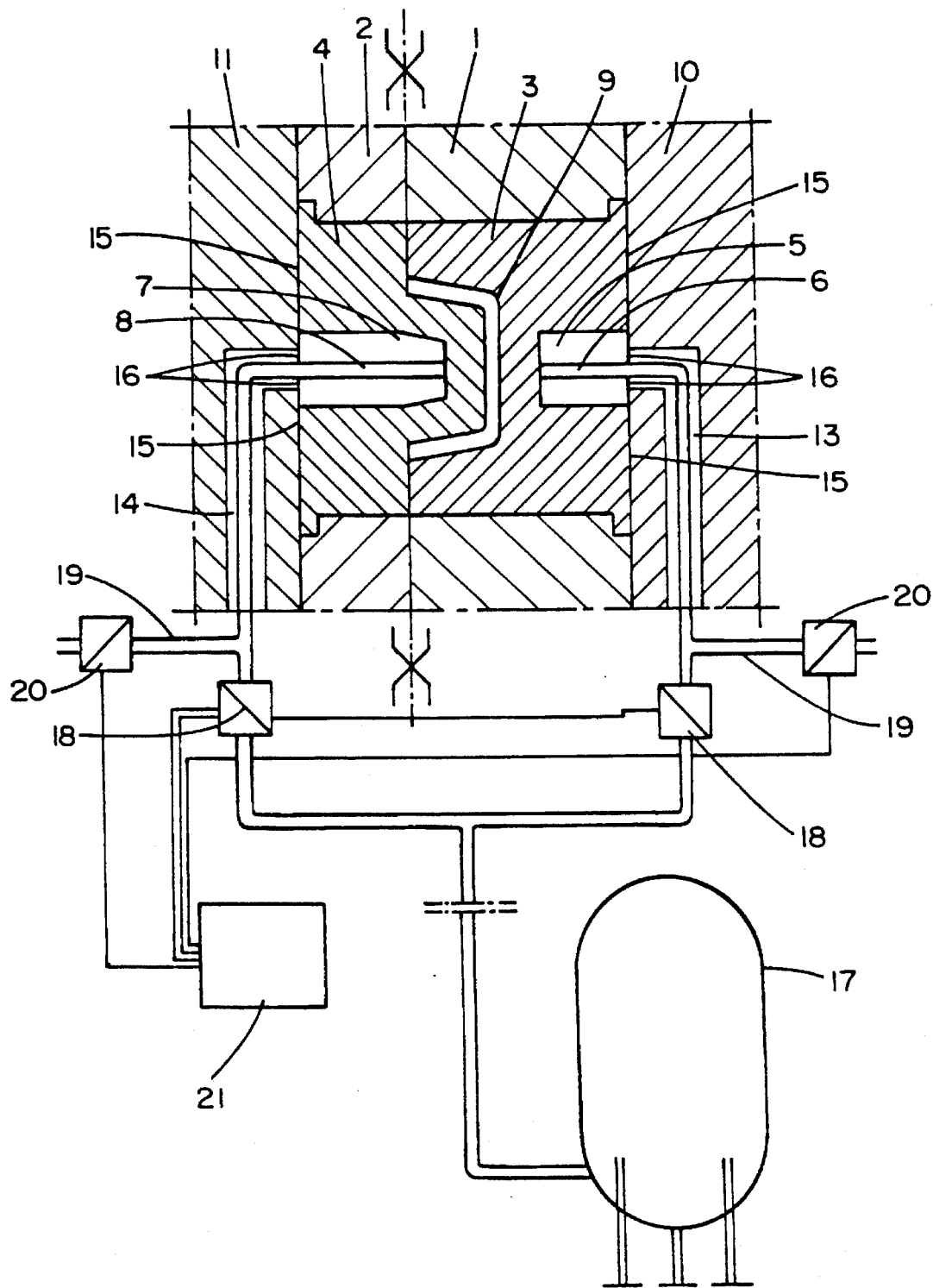
FIG. 2 shows a modification of the device according to FIG. 1.

The molding tool according to FIG. 2 corresponds exactly to that according to FIG. 1 with the exception that the capillary tubes 6, 8 do not run freely into the expansion rooms 5 and 7 respectively but reach all the way to the inner wall of the expansion rooms. The same reference numerals are used for corresponding details on the two figures.

Figure 3:
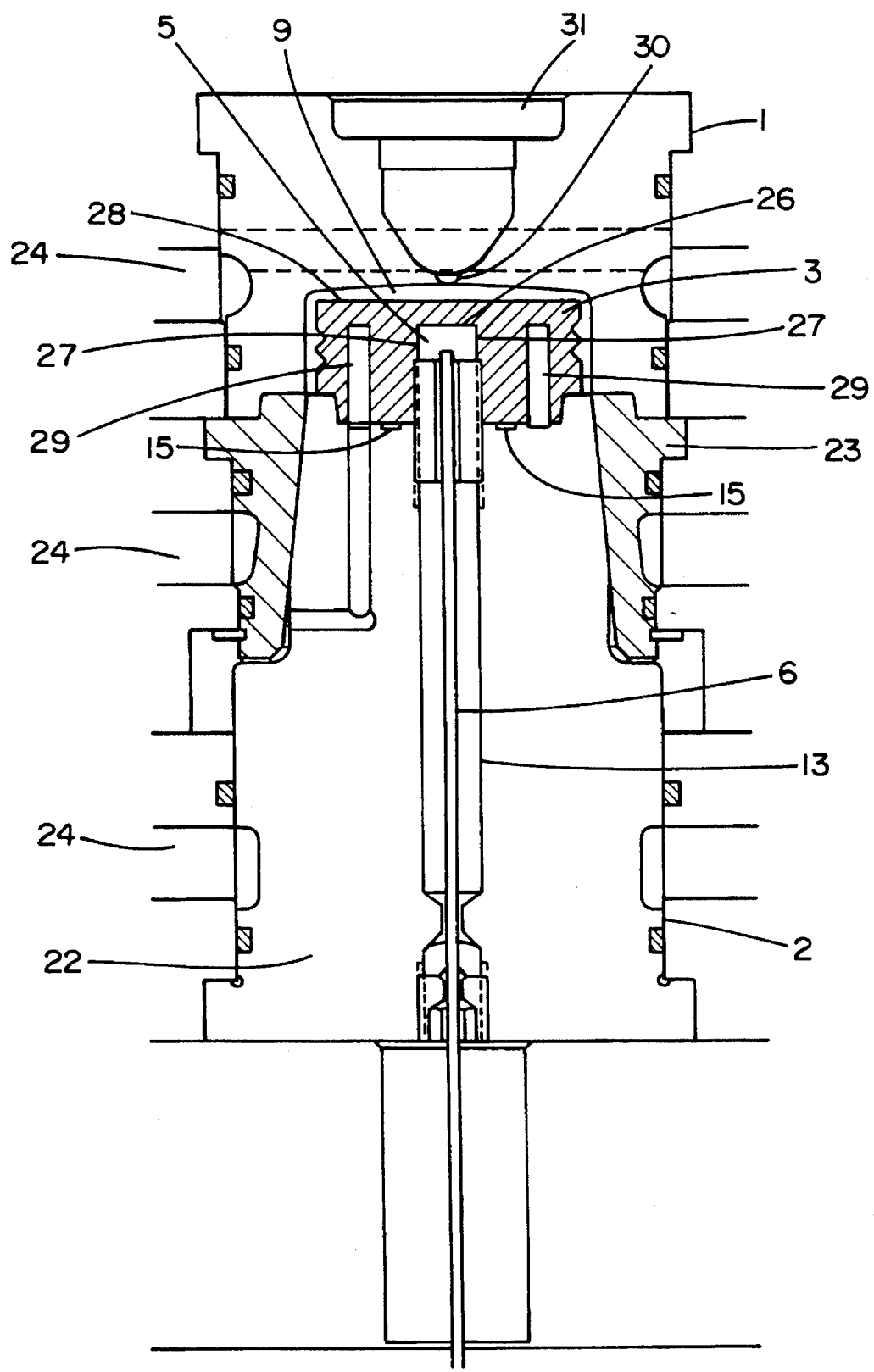
FIGS. 3, 4 and 5 illustrate in simplified form a cross-section of injection molding tools used at other embodiments of the invention.

On FIG. 3 another embodiment of an injection molding tool comprising one mobile half 1 of ordinary unporous tool steel and one stationary half 2 is shown. The molding half 2 comprises a part 22 of ordinary unporous tool steel to which a molding part 3 of porous sintered material with communicating pores as disclosed above has been firmly attached.

A mobile molding part 23 is attached to the molding part 22. The part 23 is made of unporous ordinary tool steel. Both mold halves 1, 2 are provided with ordinary water cooling channels 24.

In the part 3 there is an expansion room 5 whereinto a capillary tube 6 runs and stops at a short distance from the upper wall 26 of the expansion room 5. The side walls 27 of the expansion room 5 are tight while the upper wall 26 has a surface with open pores communicating with the pores of the part 3.

The pores of the part 3 are closed at the surface 28 towards a molding cavity 9 formed between the molding parts 1 and 2.

A recess 13 for the capillary tube 6 has been made in the molding part 23. Sealings 15 are arranged between the parts 3 and 23.

A container (not shown) with coolant fluid is connected to the capillary tube 6. The fluid is charged discontinously in pulses usually lasting about 1 to 5 seconds with intervening pauses of about 0.5 to 1.5 seconds. The supply of the fluid is regulated by valves and the fluid is charged at higher than atmospheric pressure. Usually the coolant fluid is a liquid state gas such as carbon dioxide stored at high pressure in the container.

The porous molding part 3 is provided with evacuation channels 29 for the coolant gaseous state fluid.

Molten polymer can for example be introduced into the molding cavity 9 via the sprue 30 of an injection molding machine 31.

Figure 4:
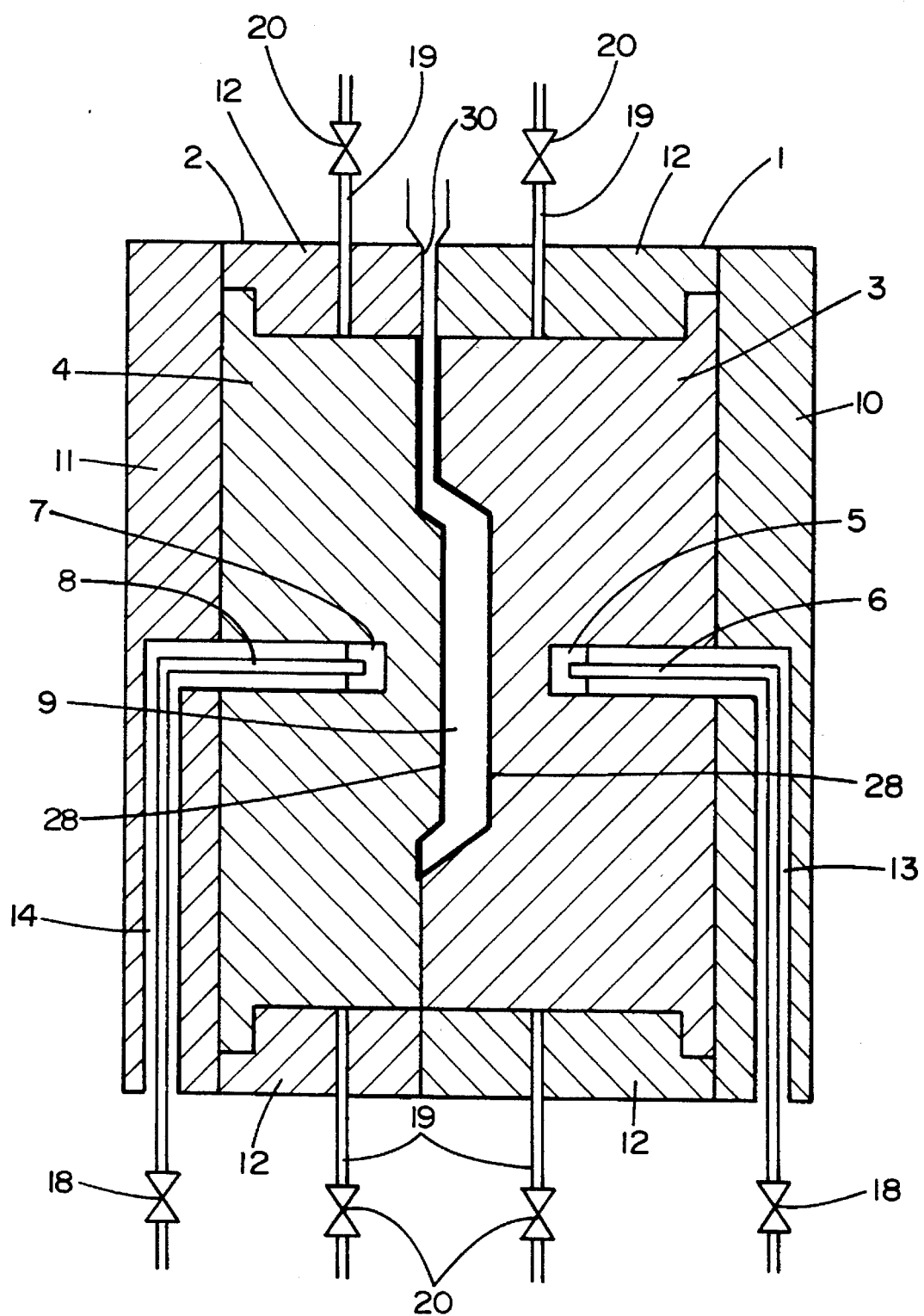

FIG. 4 shows a further embodiment of an injection molding tool comprising one mobile half 1 and one stationary half 2.

Each molding half comprises a molding part 3, 4 made of a porous sintered material with communicating pores as disclosed above. In the part 3 there is an expansion room 5 whereinto a capillary tube 6 runs. Also the part 4 contains an expansion room 7 whereinto a capillary tube 8 runs. The capillary tubes 6 and 8 run freely into the expansion rooms 5 and 7 respectively and stop a short distance from the inner wall of the expansion rooms.

Between the molding halves 1 and 2 a moulding cavity 9 is formed. The molding parts 3 and 4 have pores which are closed at the surface 28 towards the moulding cavity 9. At the outside the molding parts 3 and 4 are provided with non-porous molding parts 10, 11 and 12 respectively on all sides. Recesses 13 and 14 for the capillary tubes 6 and 8 respectively have been made in the molding parts 10 and 11.

Sealings (not shown) are arranged between the parts 3 and 10 and 4 and 11 respectively in the same way as according to FIG. 1. Sealings (no shown) are also arranged between the outer surfaces of the capillary tubes 6, 8 and the recesses 13 and 14 respectively in the same way as according to FIG. 1.

A container (not shown) with coolant fluid is connected to the capillary tubes 6, 8. The supply of coolant fluid can be regulated by valves 18.

The fluid is charged discontinuously in pulses usually lasting about 1 to 5 seconds with intervening pauses of about 0.5 to 1.5 seconds. The fluid is charged at higher than atmospheric pressure.

Usually the coolant fluid is a liquid state gas such as carbon dioxide stored at a high pressure in the container.

If the coolant fluid is a liquid state gas such as compressed carbon dioxide it will immediately upon entering the expansion rooms 5 and 7 be expanded and transformed to gaseous state whereby a strong cooling effect is obtained. The gas will be distributed in the communicating pores of the molding parts 3, 4 and finally evacuated via evacuation channels 19. The opening and closing of the evacuation channels 19 can be regulated by vents 20.

By having the valves 20 closed until the pressure in the pores of the parts 3 and 4 increases to such a level that the coolant gas is transformed to liquid state again a strong coolant effect will be obtained when the valves 20 are opened and the liquid state gas is transformed to gaseous state.

By placing the evacuation channels 19 in proper places a regulated cooling effect can be obtained. Often many evacuation channels are used. Usually the number is between 2 and 12.

Molten polymer is introduced into the molding cavity 9 via the sprue 30 of an injection molding machine.

At certain applications some of the evacuation channels 19 are used for charging warm gas into the porous parts 3 and 4 for preheating the molding tool before the introduction of molten polymer in the cavity. The warm gas is evacuated via the channels 19 not used for charging the warm gas.

Figure 5:
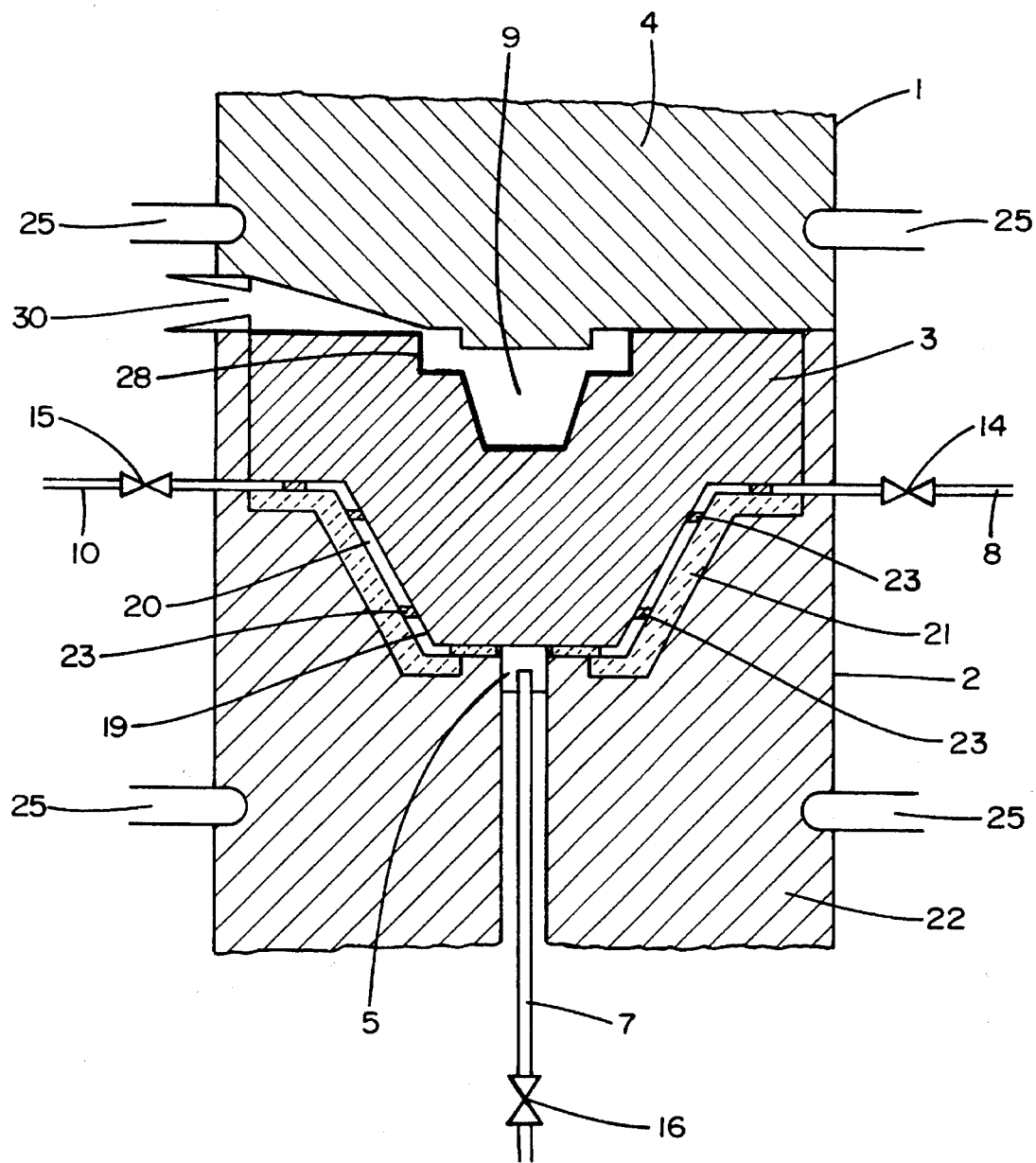

Yet another embodiment of an injection molding tool comprising one mobile half 1 and one stationary half 2 is shown on FIG. 5. The mobile half 1 comprises a molding part 4 made of ordinary solid unporous tool steel.

The stationary half 2 comprises a part 22 of ordinary solid unporous tool steel and a molding part 3 of porous sintered material with communicating pores as disclosed above.

The part 3 makes an insert in the part 22 and is firmly attached thereto. The part 3 rests on steel heads 23.

Between the microporous part 3 and the part 22 there is a heat insulating layer 21 of ceramics.

There is a slit 20 between the part 3 and the insulating part 21. Warm fluid, preferably gas such as carbon dioxide or nitrogen is introduced in the form of pulses or continuously into the slit 20 via a capillary tube 8 which is provided with a valve 14. The gas will then be distributed in the whole part 3 via the communicating pores therein. The gas will then be evacuated via the evacuation channel 10 which is provided with a valve 15. Usually the valve 15 is closed when the warm gas is introduced via the capillary tube 8. The valve 15 can be controlled to open when the pressure in he tube 10 has reached a certain level. Alternatively the valve 15 can be opened automatically at certain time intervals. By the warm gas the part 3 will be preheated before molten polymer is injected via a sprue 30 to a molding cavity 9 situated between the parts 3 and 4.

The pores of the part 3 are closed at the surface 28 towards the molding cavity and the part 4. The pores of the part 3 at the lower side 19 are open at least at certain areas to allow the warm fluid to enter the pores of the part 3.

Cold fluid preferably liquid state gas such as carbon dioxide or nitrogen put under a high pressure is charged preferably in the form of pulses via a capillary tube 7 provided with a valve 16 to an expansion room 5 where it is expanded and transformed to gaseous state at the creation of a very strong cooling effect. The gas is then passing through the pores of the part 3 and evacuated via the evacuation channel 10 or alternatively via both the capillary tube 8 and the evacuation channel 10. Usually the valves 14 and 15 are closed when the gas is charged via the pipe 7. When the warm gas is fed via the tube 8, the valve 16 is closed.

The parts 22 and 4 are cooled by ordinary water cooling channels 25.

Example 1 shows injection molding of a small lid of polypropylene by means of a molding tool designed according FIG. 1, whereby the molded product is ejected out of the mold by means of a tempering gas. Example 2 illustrates injection molding of a pump membrane thereby the membrane is ejected out of the mold by means of a tempering gas. Example 3 shows production of a partition wall of polypropylene whereby the production cycle is decreased by local cooling of the injection site according to one embodiment of the invention. Example 4 illustrates the injection molding of caps for bottles. A molding tool according to FIG. 3 was used. Only one of the mold halves comprised a molding part of sintered metal.

EXAMPLE 1

An injection molding tool according to FIG. 1 was used for the production of a small lid of polypropylene. Then the molding tool was first closed whereupon the polymer material was injected. Liquid state carbon dioxide was fed via the capillary tubes 6 and 8. Then the liquid state carbon dioxide was transformed to gaseous state by expansion in the expansion rooms 5 and 7. The gas was immediately distributed in the communicating pores of the molding parts 3 and 4 whereby a strong cooling effect was obtained. Thus, the temperature in these parts decreased to −10° C.

The molding tool was opened whereupon a supplementary addition of liquid carbon dioxide was charged via the capillary tube 8. The liquid carbon dioxide was then transformed to gas in the expansion room 7. The gas was immediately distributed in the communicating pores of the part 4, resulting in an ejection of the plastic product out of the molding tool, whereupon the production cycle was repeated. The plastic products produced were rather transparent. The intended temperature in the molding cavity 9 was regulated by means of a thermoelement (not shown on the figures) applied in the molding cavity or near thereto. The amount of cooling gas needed for keeping the desired low temperature was regulated by means of the control unit 21 in co-operation with the thermoelement.

The cycle time was 9 seconds at the above injection molding by means of an injection molding tool according to the invention.

At the production of the same production in a conventional injection molding tool not provided with any molding parts with communicating pores according to the invention and only cooled with water the cycle time was 14 seconds.

Thus, the method according to the invention results in an extraordinary saving of time which decreases the cost per injected molded product to the corresponding degree.

EXAMPLE 2

An injection molding tool with the same principal design as according to FIG. 1 except for a few modifications was used for the production of a pump membrane of polyurethane. The membrane had a circular surface with a thickness of about 15 mm and a diameter of about 180 mm.

In this case the injection molding tool was provided with two capillary tubes 6 which ran into two different spots of the molding part 3 and two capillary tubes 8 which ran into two different spots of the molding part 4.

Of course the cross-section of the molding cavity was mainly rectangular in this case and not designed as shown in FIG. 1.

First the molding tool was closed, whereupon the polymer material was injected. Liquid carbon dioxide was then fed via the capillary tubes 6 and 8. The liquid carbon dioxide was then transformed to gas by expansion in the expansion rooms 5 and 7. The gas was immediately distributed in the communicating pores of the molding parts 3 and 4, whereby a strong cooling effect was obtained.

Then the molding tool was opened, whereupon liquid carbon dioxide was fed via the capillary tubes 6 in a supplementary addition. The liquid carbon dioxide was transformed to gas in the expansion rooms 8. The gas was immediately distributed in the communicating pores in the part 3, resulting in an ejection of the plastic product out of the molding tool, whereupon the production cycle was respected.

The membrane produced was totally perfect without any dents, porosity or inclusions of air.

The production velocity at the above injection molding by means of an injection molding tool according to the invention was 36 membranes produced per hour. The reject rate was 0%.

At the production of the same product in a conventional injection molding tool not provided with any molding parts with communicating pores according to the invention and only cooled with water the production velocity was 30 products per hour. Moreover, it was necessary to reject 40% of the membranes produced.

At the conventional production of the membrane it often got stuck in the stationary mold half depending on a vacuum effect and an adhesion. Then it had to be removed with a tool such as screw-driver. This caused the above high reject rate due to non-acceptable marks from these tools in the membranes. Moreover, problems with removal of air often occurred at the production, which often resulted in air blisters and porosity of the membranes.

These problems can be avoided completely according to the invention. The membrane is easily ejected by means of the gas. The problems with removal of air are also solved. Of course the decreased cassation in combination with a decreased cycle time according to the invention results in a considerably improved production not least from an economical viewpoint.

EXAMPLE 3

In a conventional injection molding tool with water cooling partition walls of polypropylene for a drawer were made. The cycle time became long, 27.4 seconds due to overheating in the heat-channel gate.

A minor change of the molding tool was made by making a small recess in one molding half opposite to the runner gate. In said recess a porous molding part of sintered material according to the invention was placed. The molding part was shaped like a casing and placed with the opening downwards. A capillary tube ran into the casing.

First the molding tool was closed whereupon the polymer material was injected. Liquid carbon dioxide was then fed via the capillary tube. The liquid carbon dioxide was transformed to gas by expansion inside the casing formed part. The gas was immediately distributed in the communicating pores of the casing formed part, whereby a strong cooling effect was obtained in the area of the runner gate. The cycle time become 20.2 seconds.

The tool was opened again and the partition wall produced was removed. The molding tool was closed and the cycle was repeated.

EXAMPLE 4

An injection molding tool according to FIG. 3 was used for the production of caps made of polypropylene. The molding tool was first closed whereupon molten polymer material was injected via the sprue 30 of an injection molding machine 31. Liquid state carbon dioxide was fed in short pulses via the capillary tube 6. Then the liquid state carbon dioxide was transformed to gaseous state by expansion in the expansion room 5. The gas was immediately distributed in the communicating pores of the molding part 3 via the upper wall 26 of the expansion room having open pores and evacuated via the evacuation channels 29 whereby a strong cooling effect was obtained. Thus, an even temperature around freezing point was achieved.

The molding tool was opened by separating the molding half 1 from the stationary molding half 2.

The cap produced was ejected by means of the mobile part 23 which was moved away from the molding part 22. When the cap had been ejected the part 23 went back to its inner position and the two mold halves 1 and 2 were closed, whereupon the production cycle was repeated.

Cooling water was circulated via the cooling channels 24.

The cycle time was about 9 seconds at the above injection molding by means of an injection molding tool according to the invention.

At the production of the same product in a conventional water cooled injection molding tool not provided with any molding parts with communicating pores according to the invention and only cooled with water the cycle time was about 13 seconds.

Thus, the method according to the invention results in an extraordinary saving of time which decreases the cost per injected molded product to the corresponding degree.

The present invention is not limited to the embodiments shown, since these can be modified in different ways within the scope of the invention.

I claim:

1. A method of tempering a molding tool comprising (a) introducing molten polymer into a molding cavity, said molding cavity formed by at least two members, wherein at least one of said molding members is made of sintered metal or metal alloy having communicating pores, the pores being closed toward said molding cavity; (b) introducing a coolant fluid at higher than atmospheric pressure into said communicating pores, of said porous molding member, said fluid selected from the group consisting of carbon dioxide, nitrogen, air, argon, helium, hydrogen or a mixture of at least two thereof and introduced into said pores by means of at least one inlet which passes through an envelope surface being tight at least around said inlet, the coolant fluid being evacuated via at least one separate evacuation channel or via open parts of the envelope surface, whereby said molten polymer is solidified into a polymeric article in said molding cavity by said coolant fluid; and (c) opening said molding tool.

2. A method according to claim 1, wherein the coolant fluid in step (b) is introduced into an expansion room provided in said molding member and in communication with said communicating pores.

3. A method according to claim 1, wherein the inlet consists of a channel or capillary tube.

4. A method according to claim 1, wherein the inlet consist of a slot situated between the porous member of sintered metal and a solid nonporous supporting member.

5. A method according to claim 4, wherein the solid backing members is made of metal, metal alloy or ceramics.

6. A method according to claim 4, wherein the member of sintered metal facing the molding cavity is thin whereby a rapid tempering is achieved.

7. A method according to claim 1, wherein the introduction of coolant fluid and evacuation thereof in step (b) is made continuously.

8. A method according to claim 1, wherein the introduction of the coolant fluid and evacuation thereof in step (b) is made discontinuously in pulses.

9. A method according to claim 2 or 4, wherein the coolant fluid in step (b) is a liquid state gas until it reaches the expansion room or the slot respectively where it is transformed to a gas which is distributed through the communicating pores at cooling of the polymeric material.

10. A method according to claim 1, comprising (d) introducing warm gas into the communicating pores while said molding tool is open.

11. A method according to claim 1, comprising (e) introducing warm gas into the communicating pores prior to the introduction in step (a) of molten polymer into the molding cavity of a closed molding tool.

12. A method according to claim 10 or 11, wherein the warm gas is introduced via at least one separate inlet placed close to the molding cavity surface to bring about a rapid heating of the molding members defining the molding cavity.

13. A method in accordance with claim 1 wherein said polymeric material is a thermoplastic selected from the group consisting of polypropylene, polyvinyl chloride, polyethylene, polystyrene and polyethylene terephthalate; a thermosetting resin selected from the group consisting of polyesters, phenolic plastics and amino plastics; or an ionomeric thermoplastic.

14. A method in accordance with claim 13 wherein said polymer is high transparency polypropylene.

15. A method in accordance with claim 1 wherein said introduction of said polymer into said molding tool in step (a) is by injection.

16. A method in accordance with claim 6 wherein said molding tool temperature in steps (a) to (e) varies from −25° C. to 200° C.

17. A method in accordance with claim 1 wherein two mold members are used and both are formed of sintered metal.

18. A method in accordance with claim 1 wherein gas included in said closed molding cavity, forced out of said cavity in said step (a), is removed through said evacuation channels.

19. A method according to claim 10 or 11, wherein the coolant and the warm gas respectively is charged in steps (d) and (e) at a pressure of 2–70 atmospheres through the inlet into the molding tool.

20. A method according to claim 1, wherein the evacuation channel is provided with a valve by which the pressure of the gas in the pores can be regulated.

21. A method according to claim 1, wherein a liquid coolant gas is charged in step (b) in such an amount and velocity that the pressure of the resulting coolant gas reaches a level where the gas is transformed to liquid which is then let to expand to gas.

22. A method according to claim 1, wherein the pores of the porous molding member at the surface of the molding cavity are closed by a thin layer formed by means of mechanical treatment, heat treatment or coating of the surface.

23. A method according to claim 22, wherein the coating is provided by vacuum coating including chemical gas coating and physical gas coating including evaporation, ion plating and sputtering.

24. A method according to claim 22, wherein the surface is coated with a thin layer of titanium, nickel, chromium, titanium carbide, titanium nitride or aluminum trioxide.

25. A method according to claim 22, wherein the thin layer has a thickness of 1 μm to 2 mm.

26. A method according to claim 22, wherein the thin layer has a thickness of 3 μm to 0.5 mm.

27. A method according to claim 1, wherein the evacuation channel is formed or placed in the member of sintered material and reaches through the envelope surface, a part of the surface of said evacuation channel situated inside said member being tight.

28. A method according to claim 22, wherein at least one molding member is provided with a glossy or textured molding cavity surface.

29. A method according to claim 1, wherein the sintered metal or metal alloy is selected from the group consisting of iron based low alloy carbon steel, stainless steel and high alloy steel containing titanium, nickel, wolfram, chromium or molybdenum.

* * * * *